June 10, 1969  R. K. NELSON  3,448,635
LIMITED SLIP DIFFERENTIAL DEVICE
Filed March 27, 1967  Sheet 2 of 3

INVENTOR
ROBERT K. NELSON

BY

ATTORNEYS

United States Patent Office 3,448,635
Patented June 10, 1969

3,448,635
LIMITED SLIP DIFFERENTIAL DEVICE
Robert K. Nelson, Shaker Heights, Ohio, assignor to Eaton Yale & Towne Inc., Cleveland, Ohio, a corporation of Ohio
Filed Mar. 27, 1967, Ser. No. 626,216
Int. Cl. F16h 1/44
U.S. Cl. 74—710.5    6 Claims

ABSTRACT OF THE DISCLOSURE

A limited slip differential mechanism which is engageable or disengageable at the option of the vehicle operator and through a friction disk clutch arrangement controls the relative rotative speeds of the vehicle wheels and related axle shafts, while permitting a release of the friction disk clutch arrangement and relative rotation of the vehicle wheels and related axle shafts upon predetermined road conditions and vehicle operation.

---

The present invention relates to differential mechanisms such as employed in vehicle interaxle or final drives which are adapted to equally divide and positively transmit torque to the driving wheels of the vehicle. In particular, this invention relates to a selectively activated differential friction clutch which permits a limited differentiating action under predetermined torque conditions encountered by the vehicle wheels.

The advantages of a limited differential arrangement of the interaxle or final drive of a vehicle are well known. A conventional vehicle differential allows a difference in angular velocity between two driving wheels while turning corners; however, if one of the driving wheels encounters poor traction on a slippery surface, such will cause the wheel to spin and receive substantially all of the driving torque, while the opposite wheel will remain stationary. This operating condition is encountered when a vehicle has one of its driving wheels bearing on an icy or slippery spot on the roadway, while the other wheels are contacting and/or bearing on a surface having a greater coefficient of friction. Under such circumstances, a relatively low wheel torque will cause the wheel which bears on the slippery surface to spin and this low torque will be all the torque available to the wheel on the drive pavement and/or surface of greater coefficient of friction, which will more than likely be insufficient to move the vehicle. Well known means are often provided for automatically reducing or eliminating the relative wheel angular velocities by reducing or eliminating the normal action of the axle differential. The wheel engaging on the surface having the greater coefficient of friction is subject to the greater share of the total driving torque which causes increasing stress on its associated axle shaft. It is, accordingly, an object of the present invention to provide a limiting differential action under certain traction conditions by limiting the torque transmissible by either axle shaft to a predetermined safe maximum through a friction clutch arrangement.

In conventional types of differentials employing friction clutch disks the friction disks are generally continuously loaded by compression springs and/or similar conventional force loading apparatus. However, these previous friction clutch devices are usually continuously, operatively engaged, even though the majority of the time such a device is not required. Accordingly, such friction clutch devices are continuously subjected to extreme and detrimental wear which results in frequent repair and replacement thereof. Moreover, these prior art spring biased friction clutches are generally disposed about one or both of the output axle shafts and are operatively positioned in the throat section of the axle housing. Structurally locating the spring biased friction clutch in this manner generally requires an extremely large number of friction disks and a corresponding increase in the spring rate and/or load to effectively achieve reasonable clutching action. It is accordingly, another main object of the present invention to provide a friction clutch type limiting slip differential which is engageable or disengageable at the option of the vehicle driver permitting longer life of the friction clutch over the prior art devices which are continuously engaged.

Another object of the present invention is to provide a differential with a plurality of spring biased friction clutch plates which are operatively disposed interjacent the power input member and a differential output member in such a manner that no substantial external forces are imposed on the power train within the differential mechanism.

Another prime object of this invention is to provide a differential mechanism having a spring biased multiple friction disk clutch pack for selectively connecting or disconnecting the power input member to at least one differential output member of a differential mechanism with a gear-type clutch mechanism for effecting said selective connecting or disconnecting of the spring biased multiple friction disk clutch pack to said differential output member.

A further object is the provision of a biased friction clutch assembly operatively disposed interjacent the power input member and at least one axle drive shaft on a vehicle axle mechanism so that the drive wheels will rotate simultaneously until a predetermined difference in torque or load is impressed on the respective wheels, at which time the clutch assembly bias will be overcome and relative rotation of the wheels is permitted.

Another object of the present invention is the provision of a new and improved friction clutch limited slip differential friction clutch mechanism having an improved lubricating system for lubricating both the differential gearing and the biased friction clutch mechanism and for removing generated heat from the surface of the individual friction clutch disks.

Another object of the present invention is the provision of a differential friction clutch mechanism having a lubricating system wherein the rotating differential gearing functions as a pump to direct lubricant into and through the friction clutch disk mechanism.

This invention consists of the novel construction arrangements, and devices to be hereinafter described and claimed for carrying out the above stated objects, such objects as will be apparent from the following description of the invention, illustrated with reference to the accompany drawings wherein:

Figure 1:
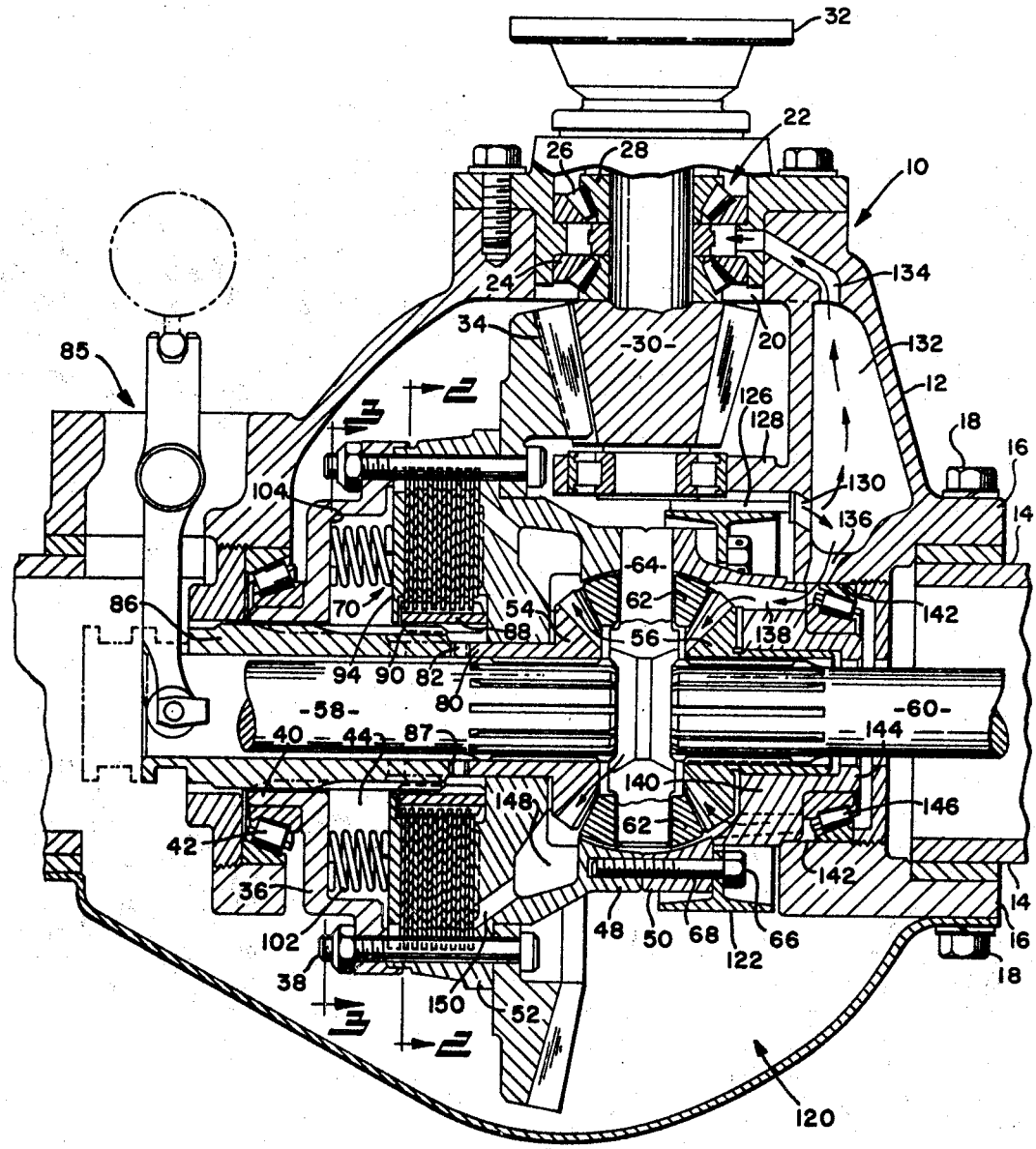
FIGURE 1 shows a cross-sectional view of the differential mechanism of the present invention.

Certain terminology will be used in the following description for convenience in reference only and will not be limited. The words "upwardly," "downwardly," "rightwardly," and "leftwardly" will designate directions in the drawings to which reference is made. The words "inwardly" and "outwardly" will refer to the directions toward and away from, respectively, the geometric center of the device and designated parts thereof. Said terminology will include the words specifically mentioned, derivatives thereof, and words of similar import.

In general, the present invention consists of providing a differential friction clutch assembly having a plurality of friction clutch disks splined to a power input member for rotation therewith cooperating with complementary alternate interleaved friction clutch disks splined to an elongated portion of a selectively actuable cultch means that is adapted to be engaged and disengaged to a differential output member. A plurality of springs are radially positioned about the geometric axis of the friction clutch disks for applying a predetermined force to the interleaved friction disks. A manually actuable control means is provided for operatively connecting or disconnecting the friction clutch assembly, such that the biased friction disks may be operatively connected, respectively, to the differential cage and one of the differential output members to effectively restrain and/or retard relative rotation of the differential output members until one differential output member encounters a predetermined loss in resistance to rotation and tends to rotate relative to the other resulting in an unsafe load on the rotating axle shaft. And, should operating conditions warrant, the friction clutch assembly may be selectively disconnected by the operator and the differential will function as a conventional differential to equally divide the input torque between the output members thereof.

Thus, when the friction clutch assembly is engaged and a vehicle is moved in a normal straightahead path, wherein substantially no differential action is required, the friction clutch assembly and the differential rotate simultaneously as an integral unit and there is substantially no relative rotation between the side gears of the differential or between the friction clutch disks of the clutch assembly. Conversely, when one driven output shaft encounters less resistance to rotation and attempts to rotate relative to the other driven output shaft, this inclination is restrained by the frictional forces developed between the clutch disks and driving torque is continually made available to the other driven output shaft. It is readily apparent the magnitude of this effect depends on the type of compression springs employed which apply the predetermined force to the friction clutch disks and the characteristics of material employed to form the individual friction disks. The force on the friction clutch disks is accomplished by compressing the spring, from a free unloaded height to a specified and/or predetermined load height wherein the spring may apply a specific predetermined load to the friction clutch assembly.

In the present invention no axial displacement or movement of the differential side gears relative to the differential pinion gears occurs and the proper pitch line of rolling contact between the respective side gears and the pinion gears will remain substantially constantly uniform thereby substantially eliminating the following disadvantages:

(1) The incident of fractured or broken gear teeth due to shock loading is substantially eliminated, such fractures being the result of increased backlash due to improper variation of the pitch line contact between the differential side and pinion gears; and (2) Misalignment of the gear teeth which causes stress concentrations in localized areas and progressive fatigue resulting in excessive gear teeth wear and eventually broken gear teeth.

Referring in greater detail to the drawings, wherein like numerals are used in the case of similar parts throughout the several views of the drawings, reference numeral 10 of FIGURE 1 discloses an axle differential mechanism. A differential carrier 12 is fastened to the axle housing 14 by a peripheral flange portion 16 utilizing conventional means such as bolts 18. The differential carrier 12 is provided with opening 20 within which is disposed a bearing assembly 22 comprising outer race 24, bearings 26, and innerrace 28 which rotatably supports input pinion 30 connected by adapter flange 32 to a drive shaft (not shown) emanating from a conventional prime mover having a conventional clutch and change speed transmission mechanism.

Figure 2:
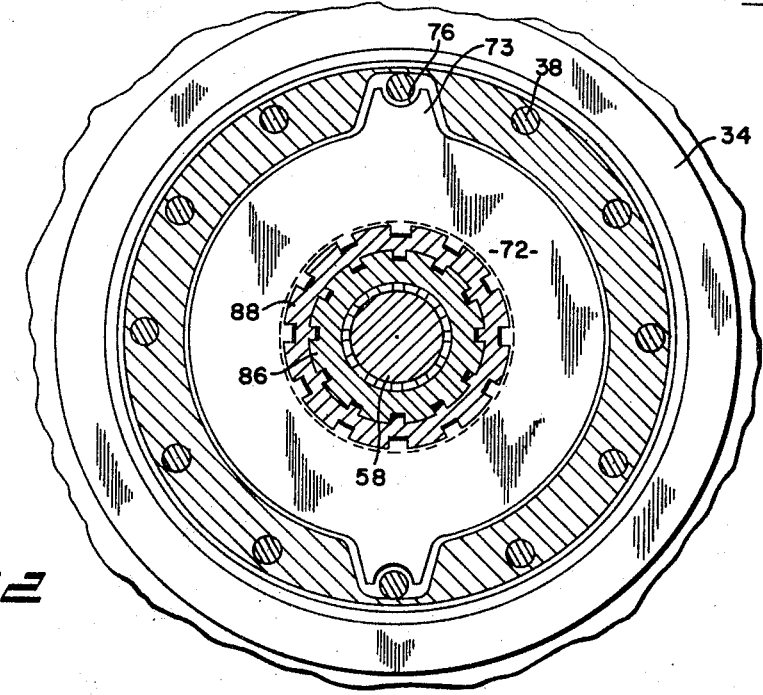
FIGURE 2 is a detailed sectional view taken along line 2—2 of FIGURE 1.

A ring gear 34 in gear meshing relationship with output pinion 30 is connected to and rotatably supported on a housing or cup-form member 36 by a plurality of conventional fasteners, as bolts 38. The cup-form member 36 has an outwardly extending tubular or hub portion 40 which is rotatably supported in the differential carrier 12 by a plurality of anti-friction bearing means 42. The housing or cup-form member 36 and attached ring gear 34 together define a hollow substantially circular internal cavity or chamber 44. The differential case 36 comprises a two-piece case having a first case portion 48 and a second case portion 50 with the first case portion 48 being provided with a radially extending flange portion 52 having the ring gear 34 fixedly attached thereto by fasteners 38. A pair of differential bevel or side gears 54 and 56 are splined or otherwise structurally disposed on complementary splines or structure of differential output shafts 58 and 60 respectively, and have a plurality of teeth meshing with opposed complementary teeth on at least one pinion gear 62 which is rotatably mounted on differential pinion gear shaft 64 centrally positioned within differential case 36 and structurally secured thereto for rotation therewith. A plurality of fasteners 66, disposed in a plurality of complementary bores 68 secure the two halves 48 and 50 of the case 36 together. A friction clutch assembly including a biased multiple friction clutch pack 70 is positioned within the cavity 44. A selected number of friction disks 72 are provided with tab extensions 73 (see FIGURE 2) having circular portions 76 in surrounding relationship to bolt means 38 which are secured to the ring gear 34. Thus, friction disks 72 are maintained in position by bolt means 38 and drivingly rotated with ring gear 34. An equal number of complementary friction disks 74 are splined to the intermediate clutch gear 88 and are interdigitated or interleaved with friction disks 72.

A hub portion 80 of side gear 54 having gear teeth 82 extends into cavity 44, a manual selectively actuable clutch member 85 includes an annular sliding clutch member 86 having gear teeth 87 to selectively engage or disengage gear teeth 82 of side gear 54. Intermediate clutch gear member 88 and slide clutch member 86 have complementary gear teeth 90 which are in cooperating engagement when the sliding clutch member 86 is moved to the right (as in FIGURE 1) and are disengaged when the sliding clutch member 86 is moved to the left. Thus, rightward movement of sliding clutch member 86 (as seen in FIGURE 1) effects a gear meshing and torque transfer engaging relationship between gear teeth 90 through gear teeth 82 and 87 for simultaneous rotation of side gear 54, clutch member 86, clutch gear member 88 and the associated friction disks 74. Whereas, upon leftward movement as illustrated in broken or dashed lines in FIGURE 1, sliding clutch member 86 disengages teeth 82 and 87 permitting relative rotation between gear 54 and sliding clutch member 86. The shift mechanism 85 can be actuated by conventional air, hydraulic, electric or air/electric shift control systems of the type which are utilized in effecting shifting of two-speed axle arrangements. It is readily apparent that sliding clutch member 86 and intermediate clutch gear element 88 may be constructed as an integral unit instead of two separate parts, for example, 86 and 88 as illustrated in FIGURE 1.

Figure 3:
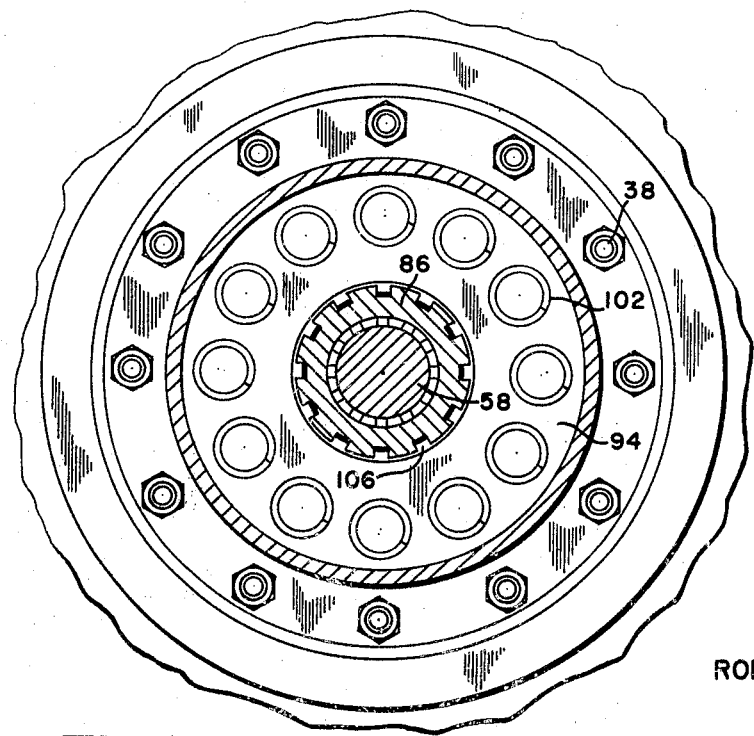
FIGURE 3 is a sectional view taken along line 3—3 of FIGURE 1.

Slidably receivable in cavity 44 (FIGURE 1) is friction clutch assembly 70 including alternate interleaved friction disks or plates 72 and 74 interconnected to ring gear 34 by bolts 38 and intermediate clutch element 88 respectively. An axially slidable pressure plate 94 is positioned on one side (left) of the friction disk pack while the differential housing defines the other (right) side of the friction disk pack 70. Spring means 102 are resiliently compressed between surface 104 of differential casing 36 and pressure plate 94. In the embodiment shown in FIGURE 1, a plurality of springs 102 are radially disposed in spaced relationship (see FIGURE 3) about pressure plate 94 for exerting an inwardly, substantially constant force of a predetermined magnitude against plate 94, whereby a substantially uniform force is exerted against the surface of friction disks 72 and 74. Pressure plate 94 is restrained from rotating relative to disks 72 and 74 by splines 106 which interfit or mesh with complementary splines on intermediate clutch element 88.

Intermediate clutch element 88 is precluded from substantial axial movement by the confining limits of the pressure plate 94 and the differential housing.

Operation

Although the operation of the limited slip differential device 10 embodying the invention has been disclosed somewhat above, the same will now be briefly described to ensure a full understanding of the invention. When the sliding clutch member 86 has been shifted to its rightmost position (see FIGURE 1) by shifting means 85, the gear teeth 87 of the sliding clutch member 86 cooperatively engage the corresponding gear teeth 82 of the differential side gear member 54. Likewise, the corresponding gear teeth 90 of the sliding clutch member 86 and the intermediate clutch gear member 88 also are in cooperative engagement when the sliding clutch member 86 is shifted to its rightmost position, thereby effecting locking of the side gear member 54 to the ring gear member 34 through the before-mentioned cooperating gear teeth sets 82 and 87 and 90 through the friction disk plates 72 and 74, which locking arrangement precludes relative rotation of the side gear ring gears. The "locking" of the side gear 54 in effect also locks side gear 56 against relative rotation to the ring gear member 34 because the differential pinion gears 62 are then precluded from spinning about their mounting shafts 64. With the differential lock arrangement so engaged, the respective axle shafts 58 and 60 are rotated at the same speeds and transfer the same amount of torque to their driving wheels. Under certain road conditions as when one driving wheel would encounter a slippery or low friction surface, while the other driving wheel has a heavy load or torque requirement thereon, the relative loads or torque requirements on the respective axles is sufficient to overcome the frictional forces within the friction disk clutch pack (provided by spring biasing means 102) and effects an "unlocking" of the differential permitting relative rotation of the axle shafts and side gears. This before-described "unlocking" of the friction disk clutch pack is only attained upon a predetermined load or torque requirements on the respective drive wheels and under normal conditions would not occur. However, in the interest of preventing any overstressing of the axle shafts or the differential gears it it necessary to provide such a safety release of the limiting differential arrangement of the friction disk clutch pack. When the shifting means 85 has shifted the sliding clutch member 86 to its leftmost position (opposite that position seen in FIGURE 1) the sliding clutch member 86 will have been removed from its cooperative engagement with the corresponding gear teeth of the side gear member 54 which will no longer be in "locked" engagement with the ring gear 34 as described hereinabove. In the "unlocked" or disengaged condition, the differential will function normally dividing the propelling effort of the input pinion 30 equally between the two driving wheels of the vehicle.

The differential means as described above embodies a new and unobvious lubricating means hereinafter described in detail. The lower part of the axle banjo portion 120 forms a liquid lubricant pick up surface 122 supported on second case portion 50 for rotation therewith by bolts 66. The lubricant pick up surface 122 is partially immersed in the lubricant reservoir and rotates into and through the reservoir to pick up lubricant therefrom. A portion of the lubricant will normally be carried on the surface 122 as it rotates with differential case 36. The lubricant carried on surface 122 is removed therefrom by nonabrasive lubricant director 126 mounted on wall surface 128 by suitable conventional fastening means. The lubricant director 126 is composed of a plastic-like material to insure the annular pick up surface 122 will not be altered due to abrasion and wear as a result of dynamic contact between the surface 122 and lubricant director 126. A lubricant receiving bore 130 communicates with lubricant receiving chamber 132 which is located immediately adjacent lubricant director 126. The lubricant director 126 is so constructed and arranged that the upper or lubricant receiving surface is slightly inclined relative to the different axis, toward the lubricant receiving port 130. The lubricant receiving chamber 132 has at least two lubricant discharge ports 134 and 136 through which lubricant is directed to various portions of the axle mechanism. The port 136 is in continuous communication with a plurality of lubricant passageways 138 formed in an elongate hub portion 140 of second case portion 50. The hub portion 140 is telescoped into bore 142 of differential carrier 12 and has an end portion 144 on a lesser diameter than the diameter of hub portion 140. The smaller end portion 144 is journaled for rotation in differential carrier 12 by anti-friction bearing means 146. Therefore, lubricant is directed by portion 136 into passageways 138 which communicate with the interior of differential case 36 for lubricating the side gears 54 and 56 and pinion gears 62. The rotating gears 54, 56 and 62 function in the manner of a gear pump and squeeze or force the fluid from the pressure side of the rotating gears to the suction side thereof. Accordingly, lubricant is forced outwardly from the rotating meshing relationship between gears 54 and 62 into a plurality of passageways 148 in the differential case portion 48. These passageways 148 direct the lubricant into annular recess 150 positioned behind a portion of pressure plate 94 and into chamber 44 wherein the lubricant is circulated to simultaneously cool and lubricate the friction disks 72 and 74. The lubricant is thereafter discharged through additional openings (not shown) in cup-form member 36 back into the lubricant reservoir 120.

Figure 4:
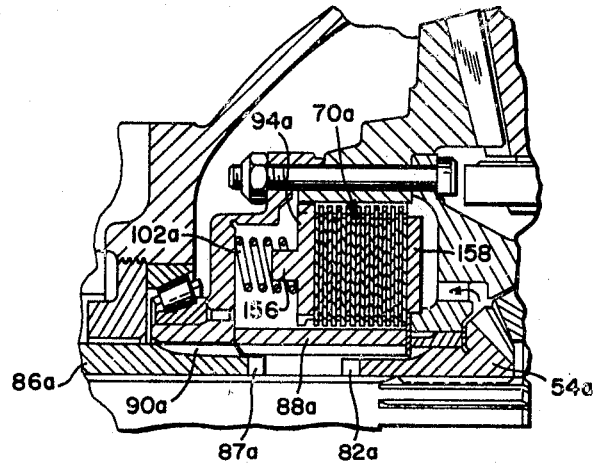
FIGURE 4 is a fragmentary elevational sectional view of a modified form of the differential friction clutch mechanism of the present invention.

FIGURE 4 illustrates another embodiment of the clutch mechanism similar to FIGURE 1, but in which intermediate clutch element 88a is entirely structurally disconnected from sliding clutch member 86a, in its leftmost position.

In this embodiment, leftward movement of sliding clutch gear 86a toward its leftmost disconnect position will effect the disengagement of clutch teeth 82a and 87a and continuous subsequent leftward movement will affect a disengagement of teeth 90a on the intermediate and sliding clutch members 88a and 86a respectively.

Conversely, rightward movement of sliding clutch member 86a toward an engaged clutching position produces a reverse sequence of the above-enumerated clutching steps.

In this embodiment, sliding clutch member 86a does not rotate in its leftmost and disconnect position. An initial clutching action must be established between intermediate element 88a and sliding clutch element 86a to establish a simultaneous rotary motion and to synchronize clutch teeth 87a with clutch teeth 82a prior to clutching interengagement therewith.

Further rightward movement of sliding clutch element 86a will effect a clutching and torque transfer interengaging relationship between clutch teeth 87a and 82a for simultaneously rotating side gear 54a and clutch elements 86a and 88a at the same speed.

A pressure plate 94a is provided against the one (left) side of friction disk pack 70a having a leftwardly extending protuberance 156 which is received within the hollow body of spring 102a and functions in the manner of a spring retaining means. A second pressure plate 158 is provided against the other (right) side of friction disk pack 70a.

Figure 5:
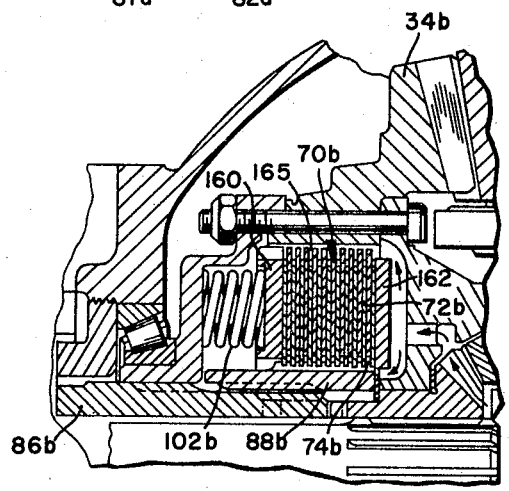
FIGURE 5 is a fragmentary sectional view of another modification of the differential friction clutch member of the present invention.

FIGURE 5 illustrates still another embodiment of the present invention wherein the inner surface of ring gear 34b is splined or has a plurality of teeth as shown at 165 and a plurality of nested friction disks or plates 72b are splined or otherwise structurally secured to the inner surface of ring gear 34b. Interdigitated or interleaved with friction disks 72b are a plurality of complementary friction disks or plates 74b which are splined or otherwise secured to the intermediate clutch element 88b. Pressure plates 160 and 162 are provided to engage the one (left) and other (right) sides of friction disk pack 70b, with pressure plate 160 having a center recess for receiving spring 102b, Groove means are provided for circulation of the lubricant to the friction disk to simultaneously cool and lubricate the friction disks 72b and 74b. Sliding clutch gear 86b and intermediate clutch member 88b cooperate as in the FIGURE 4 embodiment described hereinabove.

It should be readily apparent the embodiments of the present invention as described hereinabove function in a substantially similar manner and certain modifications, changes, and adaptations may be made in the disclosed structures and it is hereby intended to cover all such modifications, changes, adaptations and constructions which fall within the scope of the appended claims. For example, the limited slip differential arrangement of the embodiments disclosed and shown in the present invention, particularly the clutching arrangement with its friction disks, is adaptable to a two-speed axle notwithstanding the fact that the embodiments disclosed herein are all single speed axle constructions.

Having described my invention, I now claim:

1. A drive mechanism including a housing having therein torque transmitting means including:
   power input means for driving a differential case;
   said differential case containing a differential drive means having at least two driven output gears;
   first spring loaded friction clutch means mounted externally of the differential case;
   second rotatable clutch means operable between an engaged position for selectively operatively connecting and a disengaged position for operatively disconnecting the spring loaded friction clutch means to at least one of said driven output gears;
   the spring loaded friction clutch means comprising:
   (a) a first friction clutch member secured to the power input means for rotation therewith and a second friction clutch member structurally connected to a portion of said second clutch means for rotation therewith; and
   (b) spring means for continuously loading the first and second friction clutch members into an engaged friction driving relationship for transmitting uniform drive torque from the power input means to said driven output gears when the second clutch means is operatively engaged; and
   control means coacting with the second clutch means for effecting selective engagement or disengagement of said second clutch means.

2. The drive mechanism as recited in claim 1 wherein:
   said first and second friction clutch members are adapted to rotate relative to each other when said friction loading is overcome, permitting relative rotation of one said driven output gears to the other.

3. The drive mechanism as recited in claim 1 wherein:
   said drive mechanism housing has a lubricant reservoir,
   said power input means and differential case have an annular pick up surface rotatable in said lubricant reservoir to transport lubricant from said reservoir, and
   lubricant directing means having at least an edge portion composed of a non-abrasive plastic-like material located adjacent said pick up surface for removing lubricant from said pick up surface, and
   a lubricant flow directing surface connected with said edge portion and receiving lubricant removed from said pick up surface by said edge surface and directing the lubricant for delivery to different locations in said drive mechanism including said friction clutch members,
   said lubricant removing heat generated by said friction members when in frictional engagement.

4. The drive mechanism as recited in claim 1 wherein:
   the power input means includes a power input pinion in gear meshing drive relationship with a ring gear that is connected by a plurality of fastener means to the differential case; and
   the first friction clutch member being drivingly connected to at least one of said ring gear fastener means for rotation therewith at a common speed.

5. The drive mechanism as recited in claim 3 wherein:
   the first friction clutch member is splined to said ring gear for rotation therewith.

6. A drive mechanism comprising,
   power input means drivingly connected to a differential case,
   said differential case containing a differential drive mechanism for normally dividing the input drive torque equally between at least two driven output members,
   housing means secured to the differential case, said housing means having an internal cavity for receiving first spring loaded friction clutch means,
   second clutch means including a sleeve coaxial to one of said output members and axially movable between an engaged position with said output member for connecting, and a disengaged position for disconnecting the spring loaded clutch means from said one output member,
   said first spring loaded friction clutch means comprising at least two friction clutch members, with one of the friction clutch members being structurally connected to said power input member for rotation therewith, and the other friction clutch member being structurally connected to a portion of said second clutch means for rotation therewith,
   resilient means biasing said one and other friction clutch members into an engaged friction driving relationship for transmitting a uniform drive torque from said power input member to said driven output members when said second clutch means is engaged,
   and said second clutch means sleeve being so constructed for relative movement with respect to said portion to connect said second clutch to said power output member for effecting simultaneous rotation of the power input member, the first spring loaded friction clutch means and both driven output members as a unit, and for transmitting a uniform predetermined driving torque to said driven output members.

References Cited

UNITED STATES PATENTS

| | | | |
|---|---|---|---|
| 1,867,678 | 7/1932 | Rayburn | 74—711 X |
| 3,208,306 | 9/1965 | Lewis | 74—711 |
| 3,261,230 | 7/1966 | Rudnicki | 74—710.5 |
| 3,364,791 | 1/1968 | Truckle | 74—711 |

FOREIGN PATENTS

| | | |
|---|---|---|
| 858,528 | 1/1961 | Great Britain. |
| 911,448 | 11/1962 | Great Britain. |
| 996,163 | 6/1965 | Great Britain. |

OTHER REFERENCES

German printed application 1,101,975, March 1961.

DONLEY J. STOCKING, *Primary Examiner.*

T. C. PERRY, *Assistant Examiner.*

U.S. Cl. X.R.

184—6; 192—48.5